United States Patent

Glawleschkoff et al.

[15] 3,660,691

[45] May 2, 1972

[54] INTERVALOMETER

[72] Inventors: Basilius Glawleschkoff, Munich; Gebhard Krieg, Germering; Wolfgang Weidmann; Adolf Weiss, both of Munich, all of Germany

[73] Assignee: Messerschmitt-Bolkow-Blohm GmbH, Munich, Germany

[22] Filed: Nov. 9, 1970

[21] Appl. No.: 87,817

[30] Foreign Application Priority Data

Dec. 11, 1969 Germany ......................P 19 62 259.4

[52] U.S. Cl. ..........................307/293, 307/244, 307/252 K, 307/301, 307/318

[51] Int. Cl. ..........................................................H03k 4/00

[58] Field of Search ..............307/246, 293, 252 K, 283, 318, 307/133, 301; 328/106, 75

[56] References Cited

UNITED STATES PATENTS

| | | | |
|---|---|---|---|
| 3,045,150 | 7/1962 | Mann | 307/293 X |
| 3,469,153 | 9/1969 | Appelo | 317/140 |
| 3,155,879 | 11/1964 | Casey et al. | 317/36 TD X |
| 3,450,901 | 6/1969 | Dick | 328/75 X |
| 3,504,189 | 3/1970 | McHenry | 328/106 X |
| 3,378,698 | 4/1968 | Kadah | 307/246 X |
| 2,923,863 | 2/1960 | Chesson et al. | 307/293 X |

*Primary Examiner*—H. O. Jones
*Assistant Examiner*—William J. Smith
*Attorney*—Woodhams, Blanchard and Flynn

[57] ABSTRACT

Intervalometer with a uni-junction transistor in the interval timer. For the triggering of a series of intervalometer outputs there is provided only a single interval timer, said latter utilizing a capacitor therein. A Zener diode is connected between the capacitor and the ground connection and a resistor is connected from a point between the capacitor and the Zener diode to the positive potential. Switching thyristors triggered by suitably arranged control thyristors are triggered in parallel through suitable time delay elements for energizing the outputs.

9 Claims, 4 Drawing Figures

INVENTORS
BASILIUS GLAWLESCHKOFF
GEBHARD KRIEG
WOLFGANG WEIDMANN
ADOLF WEISS
BY Woodhams Blanchard & Flynn
ATTORNEYS INVENTORS
BASILIUS GLAWLESCHKOFF
GEBHARD KRIEG
WOLFGANG WEIDMANN
ADOLF WEISS
BY Woodhams Blanchard & Flynn
ATTORNEYS INVENTORS
BASILIUS GLAWLESCHKOFF
GEBHARD KRIEG
WOLFGANG WEIDMANN
ADOLF WEISS
BY Woodhams, Blanchard and Flynn
ATTORNEYS

INTERVALOMETER

The invention relates to an intervalometer with a uni-junction transistor in the interval timer.

Interval timers of this general type are known to the prior art. In these prior art devices the connection of the capacitor is made to the ground line. The voltage applied charges, through a resistor, this capacitor the voltage of which is transmitted to the control electrode of a uni-junction transistor. When the capacitor voltage reaches the ignition voltage of the transistor, the capacitor is suddenly discharged after the ignition to the residual voltage, by means of the control electrode and the base of the uni-junction transistor as well as through the resistor, a voltage impulse occuring at the resistor at certain time intervals. The residual voltage at the capacitor changes the initial conditions for the subsequent capacitor charging, i.e. the ignition voltage for the uni-junction transistor is reached earlier which results in a shortening of the time intervals after the first one. Therefore, it is not possible to trigger by use of this interval timer a number of intervalometer outputs at equal time intervals.

It is therefore the object of the invention to eliminate these disadvantages and to provide an interval timer whose initial conditions for the RC element of the first interval are adjusted to the initial conditions of the subsequent intervals.

This objective is attained by a single interval timer with a compensating device consisting of a Zener diode connected between the capacitor and the one connection and a resistor connected in series with the other connection being arranged for the triggering of all intervalometer outputs and by switching thyristors being triggered by means of control thyristors triggered in parallel by means of time delay elements inserted between, the respective cathode of the switching thyristors being connected with the respective anode of the control thyristors.

The measures according to the invention provide an interval timer in an intervalometer, which by itself triggers many outputs and actually provides equal time intervals. The need of components is reduced, particularly when non-stabilized and rectified a.c. voltages are used for feeding the equipment. Since only one timer must be calibrated, the manufacturing efforts are also reduced, which are the greater the more outputs there are and the larger the adjustable intervals are.

A further embodiment of the invention provides that between the capacitor and the first connection, a resistor be connected in parallel with a diode and a second resistor be connected in series with another connection.

A special embodiment of the invention provides that a number of control thyristors be triggered in parallel by means of an interval timer and a relay applying voltage to the next step by means of its appropriate contact being connected in series with each control thyristor.

In the following, embodiments of the invention are described and illustrated so that further advantages and measures can be seen. The illustrated arrangements are suitable, e.g., for bomb delivery and rocket ignition systems, delivery sequence and time intervals being adjustable by means of an additional circuit.

The figures show:

Figure 1:
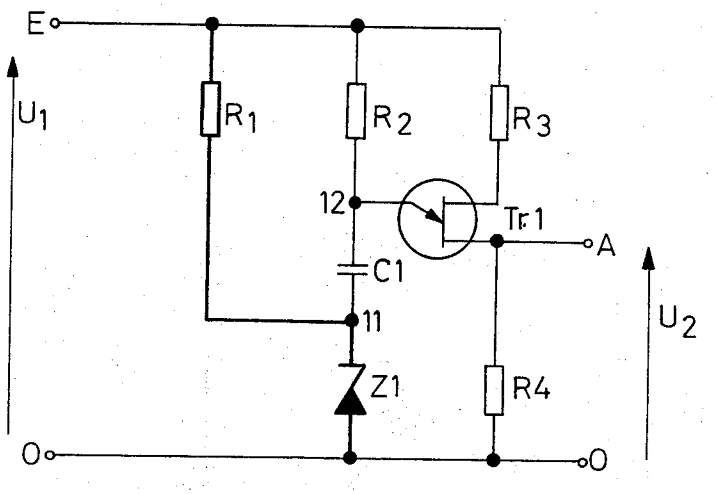
FIG. 1 is a wiring diagram of an embodiment of a compensating device according to the invention.

The compensating device according to FIG. 1 is characterized by a Zener diode Z1 which is inserted between capacitor C1 and ground line 0 and connected with positive line E of voltage U1 by means of a series resistor R1.

Figure 2:
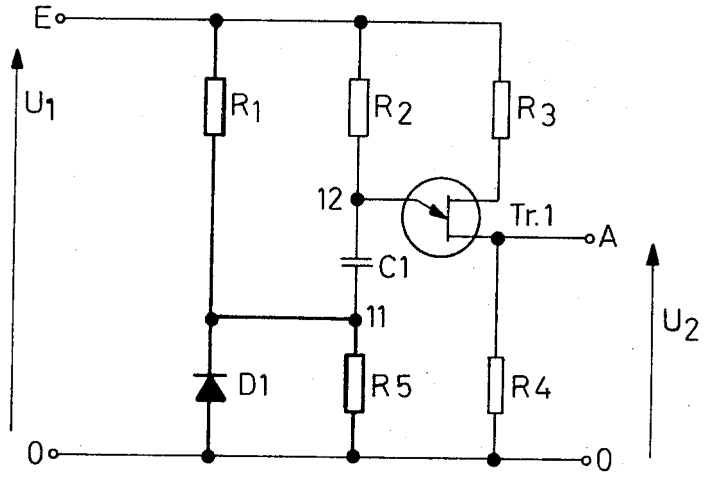
FIG. 2 is a wiring diagram of another embodiment of a compensating device according to the invention.

The compensation device according to FIG. 2 is characterized by a voltage divider with resistors R1 and R5, which is inserted between connection E and 0 and is picked off at point 11 by capacitor C1. Diode D1 is connected in parallel with R5. A common feature of the two devices is the fact that the voltage level at connection 11 and, consequently, at connection 12 of capacitor C1 is increased from $U_0$ to $U_{R1/R5}$ or $U_{Z1}$ after supply voltage U1 has been switched on.

Capacitor C 1 charges, through resistor R2, from $U_{R1/R5}$ or $U_{Z1}$ until the ignition voltage of uni-junction transistor TR 1 is reached and capacitor C 1 is discharged again.

While capacitor C 1 is discharged a discharge current flows through the base 1 of the transistor Tr1, thence through the resistor R4 and the diode D1 or Zener diode Z1 (in forward direction) as long as $$i_{D1\ or\ Z1} \geqq i_{R1}$$

where $$i_{R1} = \frac{U1 + U_{D1} \text{ or } U_{Z1} \text{ (forward direction)}}{R1}$$

When $i_{D1/Z1}$ is smaller than $i_{R1}$, the further discharge of capacitor C1 is performed by means of the resistor R1 through base 1 of the transistor Tr1 and the resistor R4. At point 11 of capacitor C1 the voltage level increases to the value of $U_{R1/R5}$ or $U_{Z1}$ given by the resistors R1 and R5. This value corresponds to the voltage level at point 12 at which the uni-junction transistor Tr1 switches from the conducting to the blocked state. Thus the capacitor C1 is again completely discharged as before the first impulse which occurs after the supply voltage U1 has been switched on.

The compensating device with Z1 and R1 according to FIG. 1 is largely independent of the input voltage U1 and largely temperature consistent (−50° to + 90° C). The compensating circuit with the resistors R1, R5 and D1 permits a perfect and simple compensation with the given voltage U1 and a given environmental temperature.

Figure 3:
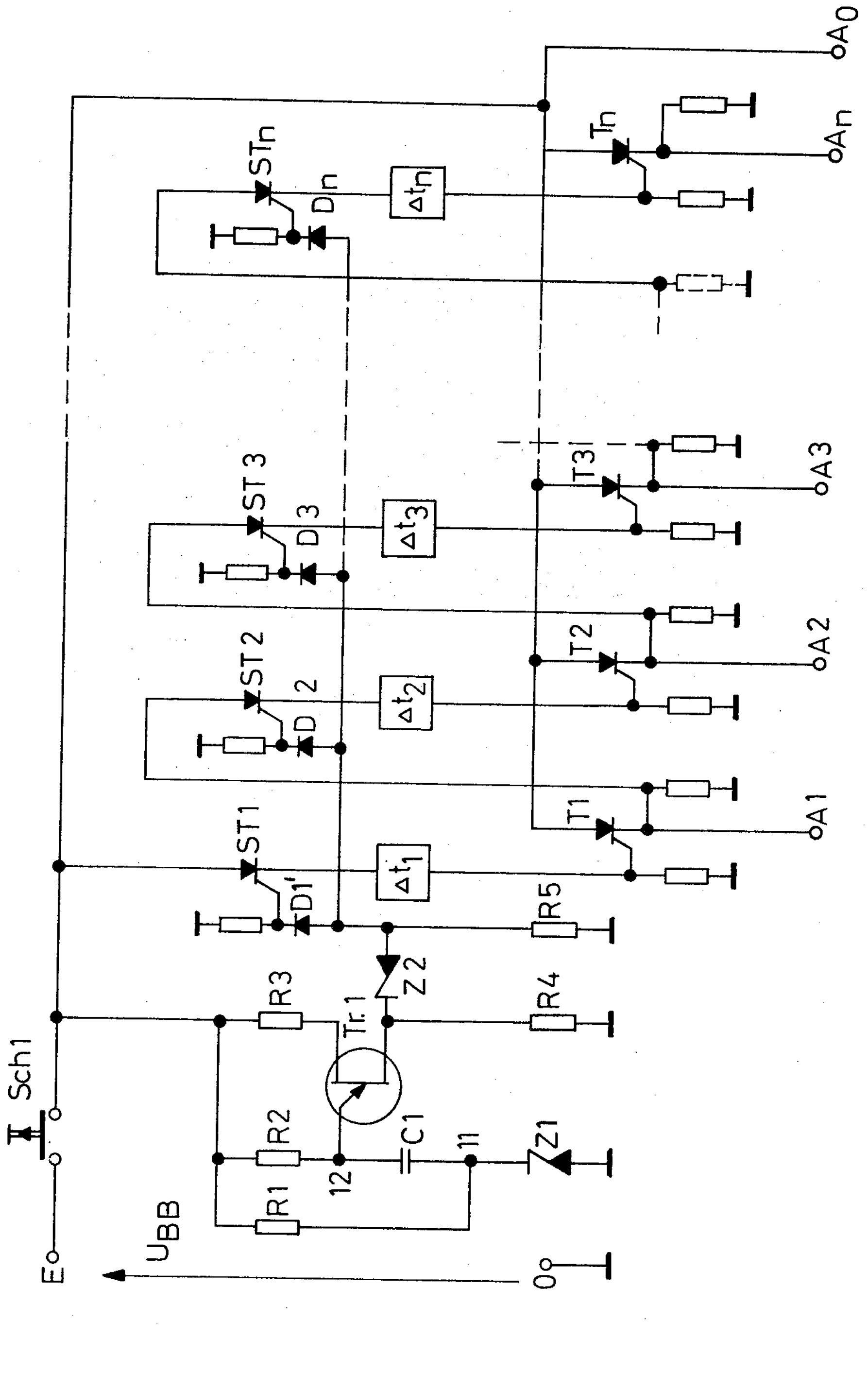
FIG. 3 is a wiring diagram of an intervalometer with electronic control.

FIG. 3 shows an intervalometer with electronic control. The interval timer of which an embodiment is shown in FIG. 1 produces, at the resistor R4, voltage impulses at time intervals $t$. These voltage impulses are transmitted to the control electrodes of the control thyristors ST1, ST2 . . . STn through the Zener diode Z2 and the diodes D1′, D2 . . . D$n$. The diodes D1′, D2 . . . D$n$ prevent a retroaction of the control thyristors already ignited upon the control thyristors not yet ignited.

Before the first voltage impulse of the inverval timer, only the anode of the first control thyristors ST1 is at a voltage less than the voltage $U_{BB}$. The first voltage impulse of the interval timer ignites the control thyristor ST1. When this control thyristor ST1 has ignited, the ignition voltage is applied to the switching thyristor T1 delayed by time $\Delta t$ of the time element $\Delta t1$. The switching thyristor T1 switches through and applies the voltage $U_{BB}$ to the intervalometer output A1 and, at the same time, to the second control thyristor ST2.

Now the control thyristor ST2 ignites the switching thyristor T2 with the second voltage impulse and delayed by time $\Delta t$ of the time element $\Delta t_2$. Thus the output A2 of the intervalometer is switched on and, at the same time, a voltage $U_{BB}$ is applied to the anode of the third control thyristor ST3. This switching sequence goes on to the last element of the intervalometer.

It is the function of the time element $\Delta t_1, \Delta t_2 \ldots \Delta t_n$ with the time delays $\Delta t$ to bridge the pulse width of the voltage impulses of the interval timer which is required to prevent the simultaneous ignition of two or more outputs of A1 . . . $A_n$ of the intervalometer.

Figure 4:
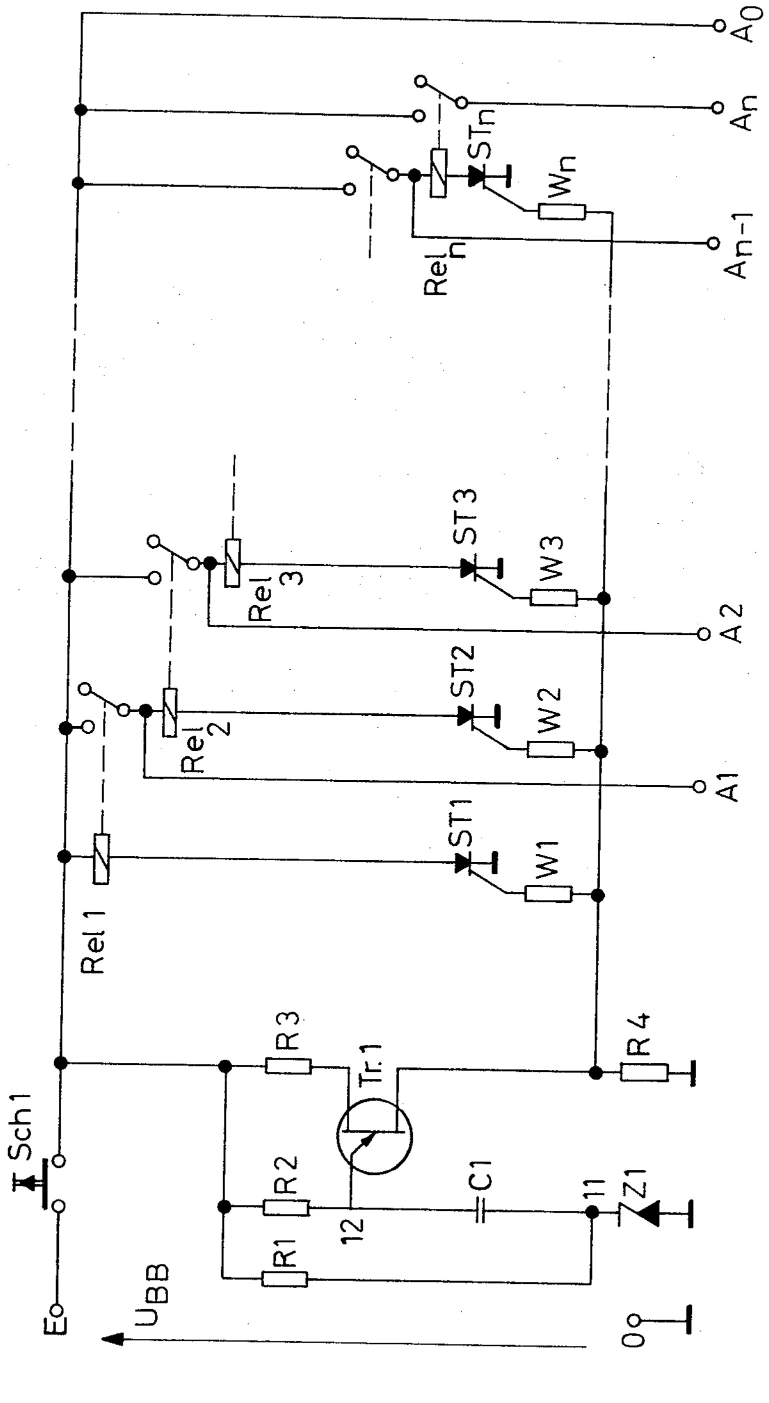
FIG. 4 is a wiring diagram of the invervalometer according to the invention with relay control.

The time delay $\Delta t$ of the time elements $\Delta t_1, \Delta t_2 \ldots \Delta t_n$ is much smaller than the time interval of the interval timer. The accuracy requirement for the time element is therefore not great, i.e.:

$$\Delta t \geqq \Delta t_x + \Delta t_s$$

where $\Delta t_x$ = pulse width of the voltage impulse of the interval timer $\Delta t_s$ = safety distance In the intervalometer with relay control shown in FIG. 4, the interval timer produces, according to FIG. 1, voltage impulses at the resistor R4 at the intervals *t*. These voltage impulses are, in parallel, transmitted to the control electrodes of the control thyristors ST1, ST2 . . . ST *n* through the resistors W1, W2 . . . W*n*.

Before the first voltage impulse of the interval timer, only the anode of the first control thyristor ST1 is at a voltage less than the voltage $U_{BB}$ through the relay coil Rel 1. The first voltage impulse of the interval timer now itnites the control thyristor ST1 and thus applies the voltage $U_{BB}$ to the relay Rel 1. This relay Rel 1 attracts the contact and applies the voltage $U_{BB}$ to the anode of the second control thyristor ST2 by means of its appropriate contact and over the relay coil Rel 2. Upon the second voltage impulse of the interval timer the control thyristor ST2 ignites and relay Rel 2 attracts the contact and applies the voltage to the next step by means of the appropriate contact. This switching sequence continues to the last element of the intervalometer. When the relays Rel 1 . . . Rel *n* attract the contacts, the outputs A1 . . . A*n* of the intervalometer are switched on at the same time. Thus the intervalometer according to the invention ensures the switching on of any number of loads at equal time intervals, the time interval being adjustable by changing R2.

We claim:

1. In an interval timer circuit having a positive input terminal, a ground input terminal and a uni-junction transistor having a pair of base electrodes and an emitter electrode, one of said base electrodes defining an output terminal, a chargeable capacitor, one side of which being connected to said emitter electrode, means defining a charging circuit for said chargeable capacitor connected to said positive input terminal and said emitter electrode and said chargeable capacitor whereby said chargeable capacitor can be charged to a value sufficient to cause a conduction of said uni-junction transistor to produce an output signal on one of said base electrodes, the improvement comprising:

compensating means including means defining a resistance connected between the other side of said capacitor and said positive input terminal and unidirectional current limiting means including an anode electrode and a cathode electrode, said cathode electrode being connected to said other side of said capacitor and said anode electrode being connected to said ground input terminal, said compensating means being provided for biasing the potential on said other side of said capacitor to a value above ground potential but below the value which will cause said uni-junction transistor to conduct to thereby assure that said chargeable capacitor is discharged to the same value each time following a time that said uni-junction transistor is rendered conductive so that the capacitor will charge to the value sufficient to cause said uni-junction transistor to conduct during equal intervals of time.

2. An interval timer circuit according to claim 1, wherein said unidirectional current limiting means comprises a Zener diode.

3. An interval timer circuit according to claim 1, wherein said unidirectional current limiting means comprises a diode and means defining a resistance connected in parallel therewith.

4. In an intervalometer circuit having a positive input terminal and a ground input terminal, the combination comprising:

a uni-junction transistor having a pair of base electrodes and an emitter electrode, one of said base electrodes defining an output terminal;

a chargeable capacitor, one side of which being connected to said emitter electrode;

means defining a charging circuit for said chargeable capacitor connected to said positive input terminal and said emitter electrode and said chargeable capacitor whereby said capacitor can be charged to a value sufficient to cause a conduction of said uni-junction transistor to produce an output signal on one of said base electrodes;

compensating means including means defining a resistance connected between the other side of said capacitor and said positive input terminal and unidirectional current limiting means including an anode electrode and a cathode electrode, said cathode electrode being connected to said other side of said capacitor and said anode electrode being connected to said ground input terminal, said compensating means being provided for biasing the potential on said other side of said capacitor to a value greater than ground potential but below the value which will cause said uni-junction transistor to conduct to thereby assure that said chargeable capacitor is discharged to the same value each time following the time that said uni-junction transistor is rendered conductive so that said capacitor will charge to the value sufficient to cause said uni-junction transistor to conduct during equal intervals of time;

first switching means series connected between said positive and ground input terminals, said first switching means having a first output terminal and being responsive to said output signal on said one of said base electrodes of said uni-junction transistor to produce a first intervalometer output at said first output terminal; and second switching means series connected between said first output terminal and said ground input terminal, said second switching means having a second output terminal and being responsive to said output signal on said one of said base electrodes of said uni-junction transistor to produce a second intervalometer output at said second output terminal following a constant interval of time from the occurrence of said first intervalometer output.

5. An intervalometer circuit according to claim 4, wherein said first switching means includes a first control thyristor and a first switching thyristor responsive to the output of said first control thyristor to thereby produce said first intervalometer output at said first output terminal.

6. An intervalometer circuit according to claim 5, wherein said second switching means includes a series connected second control thyristor and a second switching thyristor responsive to the output of said second control thyristor to thereby produce said second intervalometer output at said second output terminal.

7. An intervalometer circuit according to claim 4, wherein said first switching means includes a series connected first control thyristor and first delay timer means and a first switching thyristor responsive to the output of said first delay timer means to produce said first intervalometer output at said second output terminal, said first delay timer means effecting a small but constant time delay in the energization of said first switching thyristor; and wherein said second switching means includes a series connected second control thyristor and second delay timer means and a second switching thyristor responsive to the output of said second delay timer means to thereby produce said second intervalometer output at said second output terminal, said second delay timer means effecting a small but constant time delay in the energization of said second switching thyristor.

8. An intervalometer circuit according to claim 4, wherein said first switching means includes a series connected first control thyristor and first relay means, said relay means having a first switching contact defining said first output terminal, said first control thyristor being responsive to said output on said one base electrode of said uni-junction transistor to effect an energization of said first relay means to produce said first intervalometer output at said switching contact.

9. An intervalometer circuit according to claim 8, wherein said second switching means includes a series connected second control thyristor and second relay means, said second relay means having a second switching contact defining said second output terminal, said second control thyristor being responsive to said output on said one of said base electrodes of said uni-junction transistor to effect an energization of said second relay means to produce said second intervalometer output at said second switching contact.

* * * * *